Sept. 22, 1959                    C. O. SCHMIDT, JR                    2,905,217
                              FOOD CHOPPER KNIFE MOUNTING
Filed July 1, 1957                                              2 Sheets-Sheet 2
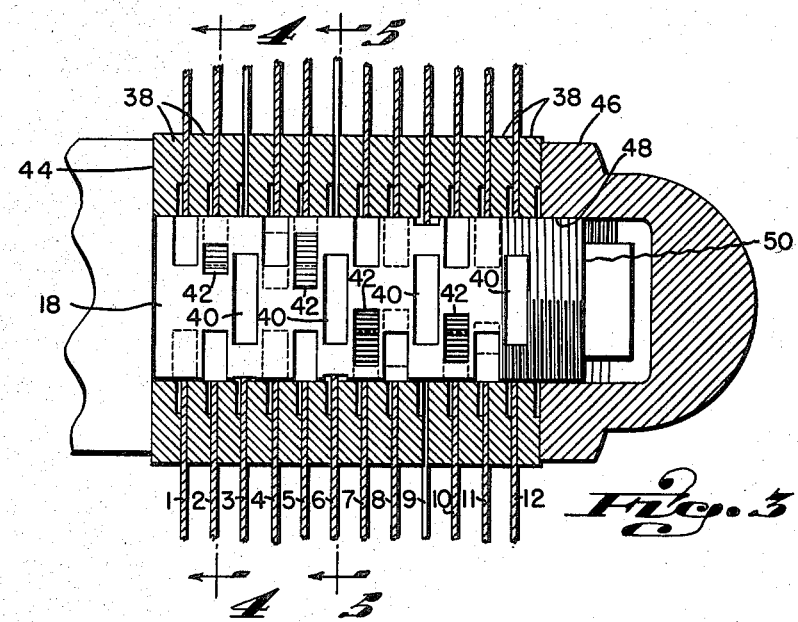
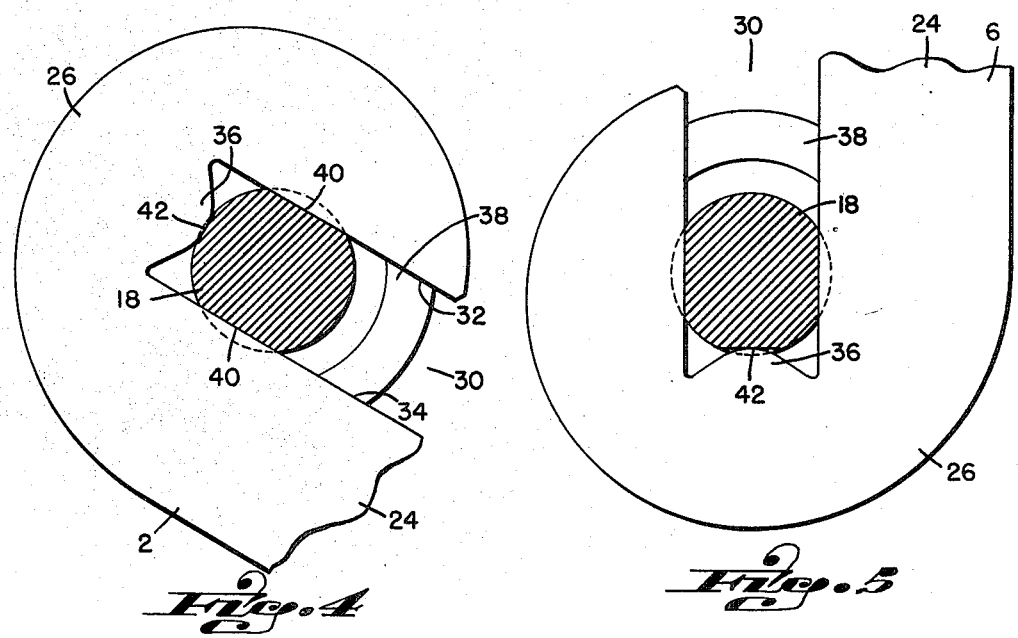
| depth | SLOT NOS. |
|---|---|
| 0 | 1, 12 |
| 1/32" | 2, 11 |
| 1/16" | 3, 10 |
| 3/32" | 4, 5, 6, 7, 8, 9 |
Shaft Slots For Knife Safety Slots
INVENTOR.
CARL OSCAR SCHMIDT, JR.
BY
J Warren Kinney Jr.
ATTORNEY

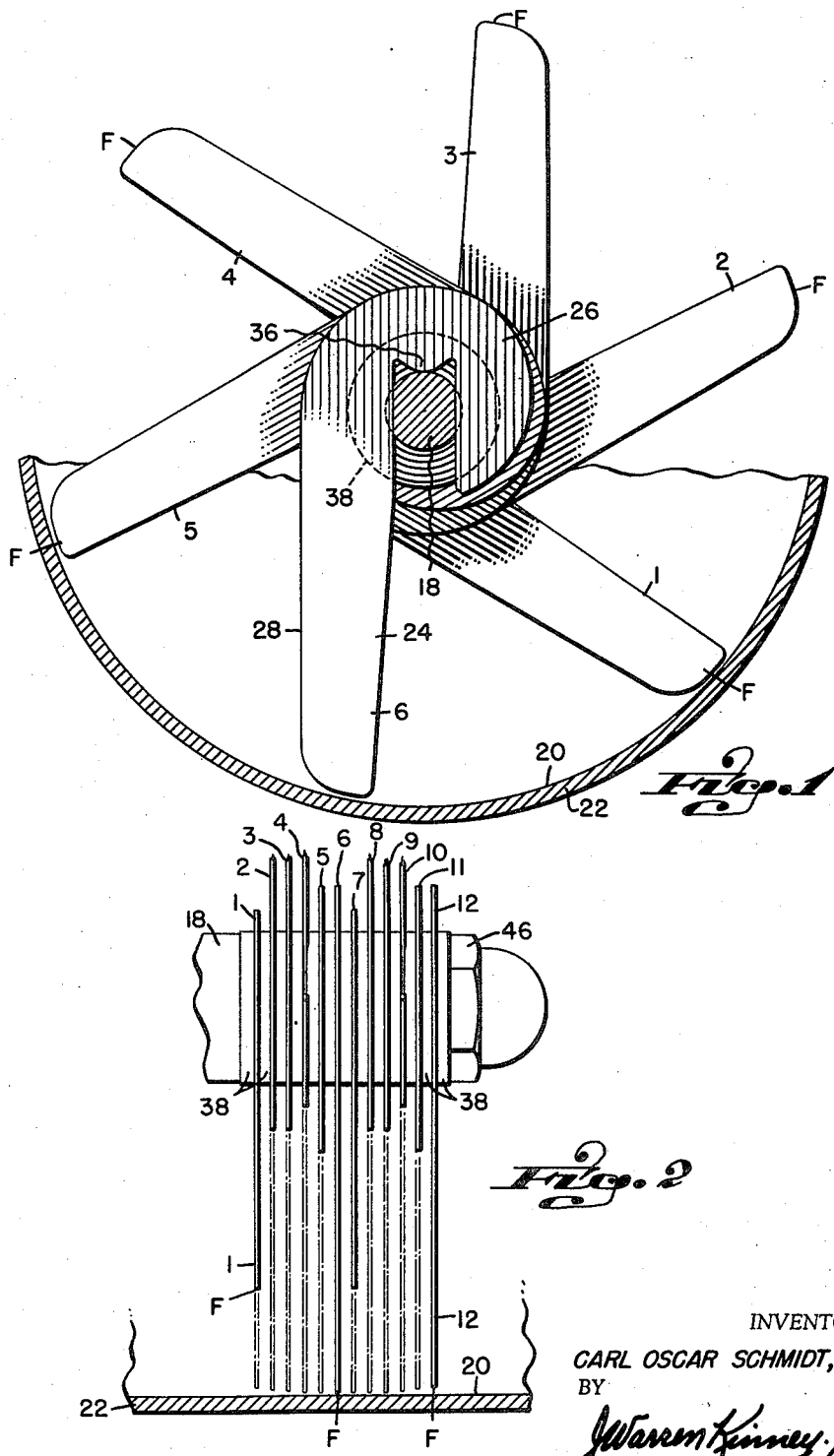

United States Patent Office 2,905,217
Patented Sept. 22, 1959

2,905,217

FOOD CHOPPER KNIFE MOUNTING

Carl Oscar Schmidt, Jr., Wyoming, Ohio, assignor to The Cincinnati Butchers' Supply Company, Cincinnati, Ohio, a corporation of Ohio Application July 1, 1957, Serial No. 669,343

8 Claims. (Cl. 146—96)

This invention relates to a food chopper and method of mounting the knives thereof. Choppers of the general character herein disclosed are widely used in the manufacture of chopped meat products and the like, and consist principally of a series of knives mounted in substantial parallelism upon a rapidly rotating shaft, the knives having ends working in close proximity to the wall of a trough which supports the meat or food undergoing chopping. The trough usually, is in the form of a moving conveyor so arranged as to subject the chopped material repeatedly to the cutting or chopping action of the knives.

An object of the present invention is to improve the chopping action of the knives in a chopping machine, thereby to ensure production of a highly palatable and wholesome food product of improved quality.

Another object is to simplify and expedite the proper fitting of knives to the knife shaft in relation to the trough wall.

Another object is to provide a knife unit so constructed as to minimize maintenance and assembly expense, while at the same time assuring automatically a proper and effective knife adjustment.

A further object is to provide a quick and effective method of assembling knives upon the knife shaft or arbor, without risking maladjustment which might injure the knives and other parts of the machine, and perhaps also the attendant in charge.

The foregoing and other objects are attained by the means described herein and illustrated in the accompanying drawings, in which:

Fig. 1 is a cross-sectional view taken transversely through the knife arbor and chopping trough of a chopping machine.

Fig. 2 is a fragmentary side elevational view of the structure shown in Fig. 1.

Fig. 3 is a fragmentary vertical cross-section of the structure shown in Fig. 2, on enlarged scale.

Fig. 4 is a cross-sectional view taken on line 4—4 of Fig. 3, and on the same scale.

Fig. 5 is a cross-sectional view taken on line 5—5 of Fig. 3, and on the same scale.

Fig. 6 is a chart showing the dimensions of knife extension limit means, therein referred to as shaft slots, for the knives of a typical chopping machine.

The chopping machine in general comprises a substantially horizontal shaft or arbor 18, which carries a series of spaced substantially parallel knives numbered from 1 to 12, for example, arranged transversely upon the shaft for rotation therewith. The sharpened free ends F of all the knife blades are adapted to sweep very close to the concave inner face 20 of the trough wall 22, in performance of a chopping action upon meat particles or the like deposited in and carried by the trough. The shaft or arbor 18 rotates axially, and may be driven by a suitable motor, not shown. The number of knives mounted upon shaft or arbor 18 is a matter of immateriality to the present invention, and twelve such knives are shown upon the drawings merely for convenience of explanation and illustration.

When twelve knives constitute the cutter unit, the knives may be arranged in pairs, that is, knife 1 and knife 12 may be paired; knives 2 and 11 may be paired; knives 3 and 10 may be paired; and other pairs may comprise, respectively, knives 4, 9, knives 5, 8, and knives 6, 7. The knives of any pair may be so mounted upon shaft 18, that both will extend from shaft 18 toward the trough surface 20 with equal amounts of spacing between the trough surface and the free ends F of the knives. This is readily evident from an examination of Fig. 2, wherein it is indicated that knife 1 and knife 12 will have equal amounts of clearance from the trough surface 20. The other knife pairs above mentioned are similarly related; however, a knife of one pair will not necessarily reach outwardly toward the trough a distance equal to the reach of another knife of a different pair.

To elaborate upon the foregoing explanation, it may be noted that the outermost knives 1 and 12 of the knife unit (Fig. 2) are paired one with the other, so that both will sweep the trough with the same amount of clearance. These knives, in the example shown, are arranged with their blades extending from the shaft at an angle of 60 degrees to one another, so that the knife ends F thereof will sweep the trough bottom at different times. It may be noted further, that knife 1 is arranged to sweep the trough bottom concurrently with knife 7, but with a different amount of clearance. These knives 1 and 7 are in substantial spaced parallelism and are disposed in parallel planes each of which intersects the axis of shaft 18. With reference to Fig. 1, knife 7 is disposed behind knife 1, and is therefore not seen in Fig. 1.

In line with the above mentioned scheme, knife 8 is behind knife 2 in Fig. 1; knife 9 is behind knife 3; knife 10 is behind knife 4; and knife 11 is behind knife 5; however, these knives so grouped do not meet the trough bottom with equal clearances, although they do meet it simultaneously, that is, knives 1 and 7 meet the trough bottom simultaneously; knives 2 and 8 meet the trough bottom simultaneously, and so on with knives 3 and 9, 4 and 10, 5 and 11, and 6 and 12. Notwithstanding the fact that various knives sweep the trough bottom at different clearances therewith, the knives are all identical in shape and size, as will be explained. The purpose of making all the knives identical, is to facilitate reconditioning thereof, and expedite refitting of the knives to the shaft accurately with great savings of time and labor.

It will be observed by referring to Fig. 2, that knife end clearances with respect to the trough bottom are progressively increased from the innermost knives of the cutter unit toward the outermost knives thereof. This arrangement serves to achieve a progressive chopping action upon the food product supported in the trough, with the result that excessive overheating of the product is avoided, thereby to preserve its initial wholesomeness and palatability. The resultant progressive mincing acts also to minimize choking of the knives and undesirable disarrangement and compiling of the material within the trough.

Each knife is J-shaped in plan, and may be formed from flat plate stock to provide a blade 24 and an integral hub 26. The leading edge 28 of the blade is sharpened, as is also the free terminal end F. The hub 26 may be substantially circular, as shown in Fig. 4, and is to be cut away in substantial parallelism with the blade 24 to provide a slot 30 whose throat is open in the direction of the blade end F. The slot is bounded by the spaced parallel edges 32 and 34, and an intermediate lip 36 which spans the edges 32 and 34 at the base of the slot. Lip 36 extends lengthwise into the slot, and by reason of its bearing upon shaft 18, determines the extent to which the knife end F will approach the trough surface 20. By grinding away some of the peak from lip 36, the clearance with which the knife end will sweep the trough is to be established.

From the foregoing, it will be understood that the lips 36 of various knives could be ground away unequally, to dispose the knife ends F at different clearance distances from the trough bottom to achieve the progressive mincing action previously mentioned; however, that would be a laborious procedure involving a great deal of gauging, and would necessitate fitting each knife always to a specified location upon shaft 18.

To avoid the aforesaid gauging and fitting difficulties, the present invention contemplates dressing the blades and grinding the lips 36 of all the knives identically, so that with the use of a suitable jig or pattern, reconditioning of the knives, and fitting thereof to the shaft 18, may be achieved with a minimum expenditure of time and skilled labor. According to this plan, different trough clearances for the several knives may be determined at the shaft 18, as follows:

At spaced intervals along the shaft or arbor 18, as determined by washers 38 or other suitable knife spacer means, the shaft is provided with pairs of flats 40 ground or milled transversely thereof to accommodate the open-ended slots 30 of all the knife hubs; that is, one pair of flats is provided for each knife. When a knife is applied to the shaft as shown in Fig. 4, the knife is assured of rotation with the shaft, due to the engagement of edges 32—34 with the slots 40 of the shaft. The shaft slots or flats 40, in pairs, are angularly disposed relatively to the shaft axis, so as to support the knives at various radial angles (see Fig. 1); and preferably, the knives are equally spaced radially about the shaft as shown.

In addition to the pairs of flats or slots 40, the shaft is provided with a series of lip shelves or seats 42, which may be in the form of transverse shallow slots milled or ground in the shaft transversely, to accommodate the lips 36 of the knives. Each knife is to engage a pair of flats 40—40 and a lip seat 42 formed on the shaft. The lip seat for a given knife is disposed in the plane of the flats 40—40 for that knife, and is preferably located on the shaft surface midway between the flats, or is 90 degrees distant from each flat of the pair.

Referring to Figs. 4 and 5, it will be seen that a difference in the depth of a seat 42 will determine the reach of a knife outwardly from the shaft. More specifically, the substantial depth of seat 42 in Fig. 5, as compared with the very shallow depth of seat 42 in Fig. 4, will cause the blade of knife 6 to extend outwardly from shaft 18, a greater distance than does the blade of knife 2, assuming the knives to be identical as contemplated by the present invention. This difference in the depth of lip seats upon the shaft, accounts for the disclosure of Fig. 2 showing identical knives disposed at various clearance distances from the trough bottom.

According to the chart, Fig. 6, the knives numbered 1 and 12 in Fig. 2 have their lips 36 resting against the shaft 18 at zero depth, so that these knives extend a minimum distance outwardly from the shaft axis. On the other hand, knives 2 and 11 have their lips 36 resting upon a lip seat which is one thirty-second inch deep in the shaft, thereby resulting in extension of these knives one thirty-second inch outwardly beyond knives 1 and 12. The lips of knives 3 and 10, according to the chart, rest upon lip seats which are depressed in the shaft circumference a distance of one-sixteenth inch; and the depth of the lip seats for the remaining knives 4 to 9, inclusive, amounts to three thirty-seconds inch. These seat depth dimensions are more or less arbitrary, and some deviation therefrom may be practiced, depending upon the nature of the material to be minced.

Since the knives are subject to wear and may require reconditioning from time to time, it is obviously advantageous to restore their original condition and re-mount them upon the shaft without regard to the location they originally occupied on the shaft. Moreover, it is a relatively simple matter to recondition the knives identically, rather than give them individual attention as to form and dimensions, in order to achieve the desired progressive mincing action hereinbefore mentioned. The improved structure herein disclosed is seen to greatly simplify and expedite reconditioning and re-mounting of the knives when necessary.

Fig. 3 shows the knife unit to comprise the shaft 18 carrying a shoulder 44 against which rests a spacer 38. Next to the first spacer is knife 1, and beyond to the right in Fig. 3 the spacers and knives are alternated until the final spacer 38 is seen to be held in position by a nut 46, which at 48 threadedly engages the threaded end 50 of shaft 18. The nut is removable for disassembly of the knife unit, but normally the nut is tightened against the pile of alternated knives and spacers. The nut is not depended upon to lock the knives against rotation relative to the shaft, this being the function of the slots 30 and flats 40—40, as before explained.

In Fig. 3, flats for the knives are indicated at 40, and serve to lock the knives to the shaft for positive rotation therewith. One pair of flats is provided for each knife. The characters 42 indicate seats on the shaft for accommodating the lips 36 of the knives, and these seats are equal in number to the number of knives carried by the shaft. One such seat is associated with each pair of flats 40—40, and any one seat is found located upon a plane normal to the shaft axis and including a pair of flats 40—40, so that the lip 36 of any knife engages a seat 42 while the slot edges 32—34 of the knife engage a pair of flats 40—40 in the same plane.

When reconditioning the knives, it may be found necessary to grind and resharpen the free ends thereof, with possible loss of blade length. In that event, the proper blade length may be restored by removing metal from the peaks of lips 36. According to the present invention, all the knives are to be dressed or ground in conformity with one another. Thereafter, they may be replaced upon the shaft or arbor 18 without considering the order in which they were removed. The lip seats or shelves 42 provided upon the shaft, are not subject to alteration as long as the shaft remains serviceable.

It is to be understood that various modifications and changes in the structural details of the device may be made, within the scope of the appended claims, without departing from the spirit of the invention.

What is claimed is:

1. A knife assembly for a chopping machine, comprising in combination, a rotatable shaft, and a plurality of interchangeable, substantially identical, duplicate knives each comprising a blade having a terminal end, and a hub on the knife having a slot therein extending in substantial parallelism with the blade, said slot having a base, and a throat opening in the direction of the terminal end of the blade, cooperative means on the knives and the shaft to enforce rotation of the knives with the shaft, and cooperative means on the shaft in the form of a series of seats disposed at progressively varying distances from the shaft axis, said seats engageable with the base of the slot of the knives to variably limit the extension of the knife ends radially of the shaft.

2. A knife assembly for a chopping machine, comprising in combination, a rotatable shaft, and a plurality of knives each including a blade having a terminal end, and a hub on the knife having a slot therein extending in substantial parallelism with the blade, said slot having a base, and a throat opening in the direction of the terminal end of the blade, a lip extending into the hub slot from the base thereof, toward the open throat, a series of seats located upon the shaft at different distances from the shaft axis, to receive and support the extending lips of the several knives individually, and co-operative means on the shaft and each knife hub, to preclude rotation of the knives relative to the shaft.

3. A knife assembly for a chopping machine, comprising in combination, a rotatable shaft, and a plurality of knives each including a blade having a terminal end, and a hub on the knife having a slot therein extending in substantial parallelism with the blade, said slot having a base, and a throat opening in the direction of the terminal end of the blade, a lip extending into the hub slot from the base thereof, said lip being equidistant from the terminal end of the blade, on all the knives, a series of seats located upon the shaft at different distances from the shaft axis, to receive and support the extending lips of the several knives individually, and co-operative means on the shaft and each knife hub, to preclude rotation of the knives relative to the shaft.

4. A knife assembly for a chopping machine, comprising in combination, a rotatable shaft having a series of transverse flats formed thereon at intervals along the length of the shaft, a plurality of knives each including a blade having a terminal end, and a hub on the knife having a slot therein extending lengthwise of the blade, said slot having confining side edges and a base, a throat in the slot opening in the direction of the terminal end of the blade, said confining edges being spaced apart and dimensioned to embrace the transverse flats of the shaft, a lip extending into the hub slot from the base thereof, toward the open throat, and a series of seats located upon the shaft at different distances from the shaft axis, to receive and support the extending lips of the several knives individually.

5. A knife assembly as set forth in claim 4, wherein the lips of all the knife slots are equally distant from the terminal ends of their respective blades.

6. A knife assembly for a chopping machine, comprising in combination, a rotatable shaft having pairs of transverse flats formed thereon at intervals along the length of the shaft, a plurality of knives each including a blade having a terminal end, and a hub on the knife having a slot therein extending lengthwise of the blade, said slot having confining parallel and coplanar side edges and a base, a throat in the slot opening in the direction of the terminal end of the blade, said confining edges being spaced apart and dimensioned to embrace the transverse flats of the shaft to preclude rotation of the knives relative to the shaft, a lip on each knife extending from the base toward the open throat of the hub slot, and a series of seats located upon the shaft at different distances from the shaft axis, said seats being equal in number to the pairs of transverse flats on the shaft, and each seat being disposed in a plane passing through a pair of said flats at right angles to the shaft axis.

7. A knife assembly as set forth in claim 6, wherein the lips of all the knife slots are equally distant from the terminal ends of their respective blades.

8. A knife assembly as set forth in claim 6, wherein all the knives are identical in form and dimensions.

References Cited in the file of this patent
UNITED STATES PATENTS
2,635,663    Schmidt _____ Apr. 21, 1953